(12) United States Patent
Goss

(10) Patent No.: US 6,454,891 B1
(45) Date of Patent: Sep. 24, 2002

(54) SPIN WELD ASSEMBLY

(75) Inventor: David C. Goss, Rockford, IL (US)

(73) Assignee: Textron Inc., Providence, RI (US)

( * ) Notice: Subject to any disclaimer, the term of this patent is extended or adjusted under 35 U.S.C. 154(b) by 195 days.

(21) Appl. No.: 09/586,428

(22) Filed: Jun. 2, 2000

(51) Int. Cl.[7] .............................................. B29C 65/06
(52) U.S. Cl. .................. 156/73.5; 156/293; 156/308.2; 411/107; 411/171
(58) Field of Search ........................ 156/69, 73.1, 73.5, 156/73.6, 293, 308.2, 580; 411/107, 171

(56) References Cited

U.S. PATENT DOCUMENTS

| | | | |
|---|---|---|---|
| 2,942,748 A | | 6/1960 | Anderson |
| 3,189,672 A | * | 6/1965 | Lyman, Jr. |
| 4,758,392 A | * | 7/1988 | Collins et al. ................ 264/68 |
| 4,850,772 A | * | 7/1989 | Jenkins |
| 4,941,788 A | * | 7/1990 | Highfield |
| 5,046,243 A | * | 9/1991 | Walker |
| 5,199,837 A | * | 4/1993 | Goss |
| 5,222,850 A | * | 6/1993 | Medal |
| 5,407,311 A | * | 4/1995 | Goss |
| 5,536,344 A | * | 7/1996 | van Dreumel et al. ..... 156/73.5 |
| 5,636,875 A | * | 6/1997 | Wasser ....................... 285/21.1 |
| 5,647,930 A | * | 7/1997 | Bright ........................ 156/73.5 |
| 5,879,115 A | * | 3/1999 | Medal |

FOREIGN PATENT DOCUMENTS

FR 2292083 6/1976
JP 54027309 9/1979

OTHER PUBLICATIONS

P.S.M. Fasteners (17 pages).*
U.S. Publication No.: 2001/0024606A1 Dated Sep. 27, 2001 – Stumpf et al. (Five Pages).

* cited by examiner

*Primary Examiner*—James Sells
(74) *Attorney, Agent, or Firm*—Trexler, Bushnell, Giangiorgi, Blackstone & Marr, Ltd.

(57) ABSTRACT

The present invention provides novel structures for spin weld assemblies and a method for forming same. The spin weld assemblies are formed by attaching a fastener to a plastic insert which is then attached to a plastic workpiece. The fastener can take the form of many different structures, preferably a stud or a nut. The fastener is formed with a drive for driving the fastener into a bore of the plastic insert having first and second ends. Self-tapping threads on the fastener engage the fastener with the plastic insert when the fastener is driven into the bore of the insert. The insert, having the fastener threadedly engaged thereto, is then rotated and generally axially displaced into an opening of the plastic workpiece, thereby spin welding the insert to the workpiece. The first end of the insert provides proper alignment for the insert to be spin welded into the opening as the diameter of the first end is smaller than that of the opening. The second end of the insert provides the intimate engaging contact between the insert and a wall that defines the opening when the insert is spin welded into the opening as the diameter of the second end is larger than the diameter of the opening.

36 Claims, 11 Drawing Sheets ns and corresponding structure thereof for spin welding a plastic insert into an opening in a plastic workpiece such as is defined by a protruding boss or a recessed cavity therein.

SPIN WELD ASSEMBLY

BACKGROUND OF THE INVENTION

The present invention relates generally to the method and corresponding structure thereof for spin welding a plastic insert into an opening in a plastic workpiece such as is defined by a protruding boss or a recessed cavity therein.

Problems may arise in the attachment of fasteners to structures which require a finished cosmetic surface. Such a structure might be found in the grill assembly of an automobile. The grill assembly must be attached to an underlying structure of the vehicle. However, the grill assembly generally cannot have fasteners extending therethrough as such fasteners will effect the cosmetic appearance of the assembly. As such, attempts have been made to add a boss to the reverse side of the grill assembly so as to allow for attachment of a stud which is used to secure the grill assembly to the vehicle.

A problem arises with the forming of a boss on the grill assembly such that if the material thicknesses of the boss and the grill assembly are not properly dimensioned, a corresponding depression or sink will occur on the cosmetic surface of the grill assembly. Because the wall thickness of the boss must be less than the wall thickness of the grill assembly to avoid the forming of a depression or sink, problems have been encountered as to how to attach a fastener to the boss. If the fasteners are threaded, the resulting stud can be quite heavy, thick and costly. It would be preferable to provide a stud which is appropriately sized for the assembly considering numerous studs would be used to retain the grill assembly on the vehicle.

Another problem that has arisen due to the requirement that the wall thickness of the boss be less than the wall thickness of the grill assembly is that there may not be enough material in the wall of the boss to properly attach the threads of the fastener thereto, thus requiring a need for additional material for engagement of the fastener.

There has also been encountered a problem of attaching a combination washer fluid reservoir with an extending fan guard to a sidewall of an engine compartment. Typically, a stud is ultrasonically welded into the reservoir to effectuate such an attachment. One of the problems with this method is that a leak can be formed between the reservoir and the cavity of the stud. As such the leak may result in accidentally draining the washer fluid reservoir. The ultrasonic welding of the stud to the reservoir also causes recycling problems should a leak occur because the stud cannot be easily separated from the reservoir.

OBJECTS AND SUMMARY OF THE INVENTION

A general object of the present invention is to provide a spin weld assembly for inserting and retaining a fastener in engagement with a plastic workpiece without creating or exacerbating defects on a cosmetic side of the workpiece.

Another object of the present invention is to have the wall thickness of a boss on the workpiece generally equal to or less than the thickness of the workpiece itself.

Yet another object of the present invention is to provide a fastener that is appropriately sized for the required attachment of workpieces.

Still another object of the present invention is to provide a plastic insert which provides the needed material for an appropriately sized fastener to engage with, while still allowing the wall thickness of the boss to be less than that of the workpiece.

Another object of the present invention is to provide a spin weld assembly for inserting and retaining a fastener in engagement with a plastic workpiece that prevents a leak from being formed between the workpiece and the cavity of the fastener.

Yet another object of the present invention is to provide an insert that is spin welded into a boss or cavity of a workpiece such that the material effected by the spin welding and that forms a tight bond with the insert is displaced from the workpiece such that there is little or no effect on the workpiece.

Another object of the present invention is to provide a fastener that can be easily removed from the workpiece should there be a leak in the workpiece, thereby allowing the material in the workpiece to be recycled.

Still another object of the present invention is that the inserts of the spin weld assembly can be installed on the molded workpiece as necessary away from the molding machine thereby increasing the efficiency and speed of the molding machine and therefore reducing the cost.

Yet another object of the present invention is to provide a vent in the insert, boss or recess thereby allowing any air which is trapped between the insert and the inside surface of the boss or cavity during the spin welding to escape therethrough.

Briefly, and in accordance with the foregoing, the present invention provides novel structures for spin weld assemblies and a method for forming same. The spin weld assemblies are formed by attaching a fastener to a plastic insert which is then attached to a plastic workpiece. The fastener can take the form of many different structures, preferably a stud or a nut. The fastener is formed with a drive for driving the fastener into a bore of the plastic insert having first and second ends. Self-tapping threads on the fastener engage the fastener with the plastic insert when the fastener is driven into the bore of the insert. The insert, having the fastener threadedly engaged thereto, is then rotated and generally axially displaced into an opening of the plastic workpiece, thereby spin welding the insert to the workpiece. The first end of the insert provides proper alignment for the insert to be spin welded into the opening as the diameter of the first end is smaller than that of the opening. The second end of the insert provides the intimate engaging contact between the insert and a wall that defines the opening when the insert is spin welded into the opening as the diameter of the second end is larger than the diameter of the opening.

BRIEF DESCRIPTION OF THE DRAWINGS

The features of the present invention which are believed to be novel are set forth with particularity in the appended claims. The organization and manner of the structure and operation of the invention, together with further objects and advantages thereof, may best be understood by reference to the following description taken in connection with the accompanying drawings wherein like reference numerals identify like elements in which:

DETAILED DESCRIPTION OF THE ILLUSTRATED EMBODIMENTS

Figure 1:
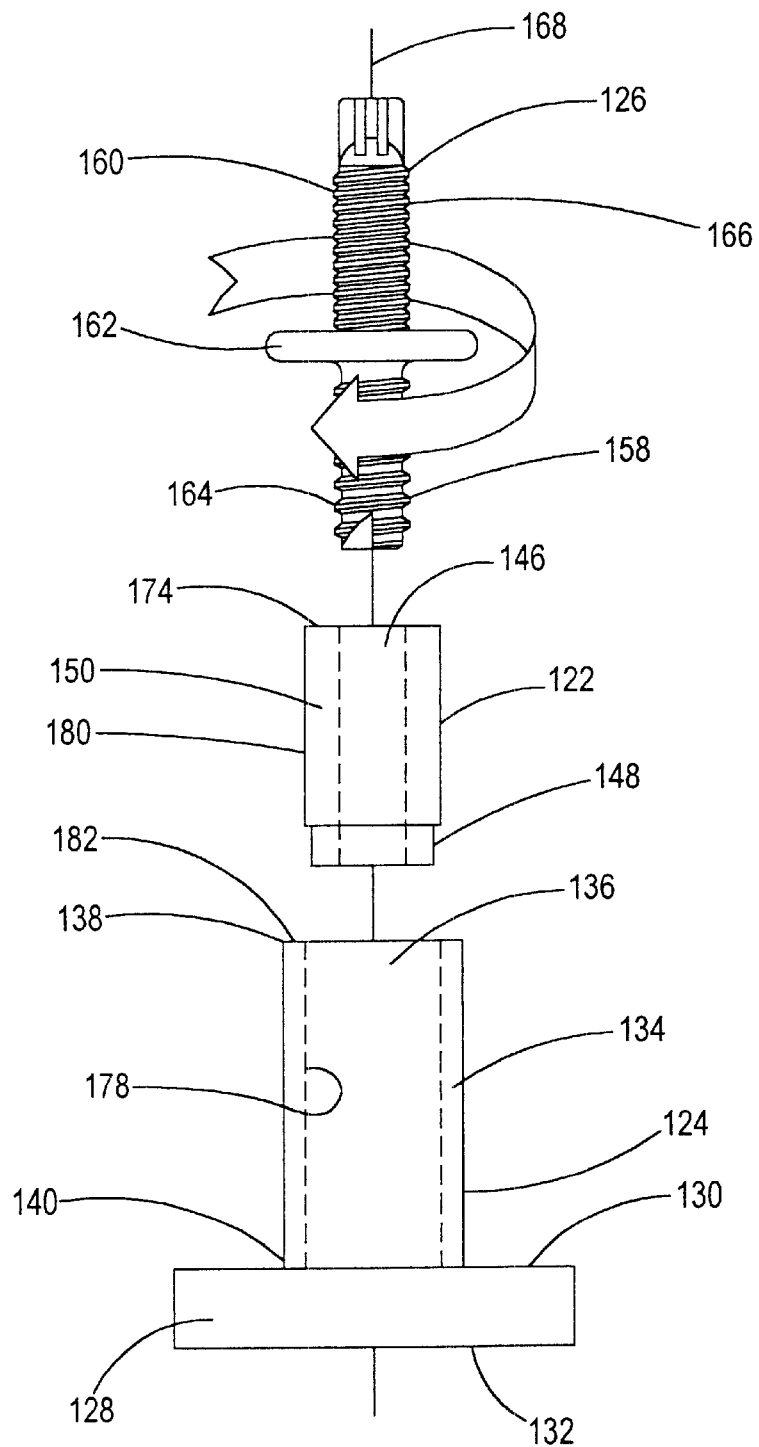
FIGS. 1–4 display a side elevational view of the method of forming the first embodiment of the spin weld assembly and the components used to form the spin weld assembly, namely a fastener in the form of a stud, an insert, and a molded workpiece having a boss formed thereon.

While this invention may be susceptible to embodiment in different forms, there is shown in the drawings and will be described herein in detail, specific embodiments with the understanding that the present disclosure is to be considered an exemplification of the principles of the invention, and is not intended to limit the invention to that as illustrated.

Figure 10:
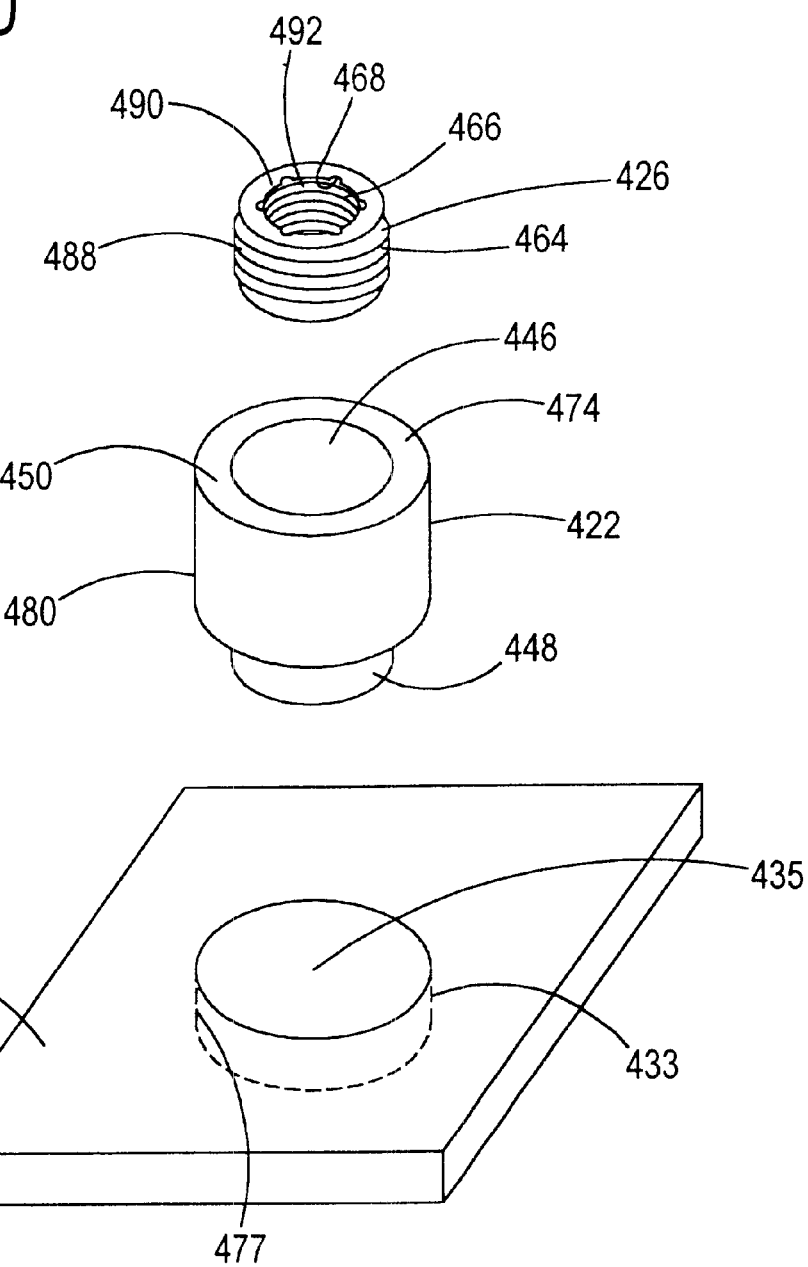
FIG. 10 displays an exploded perspective view of a fourth embodiment of the invention whereby the fastener of the third embodiment is in the form of a nut rather than a stud.
Figure 11:
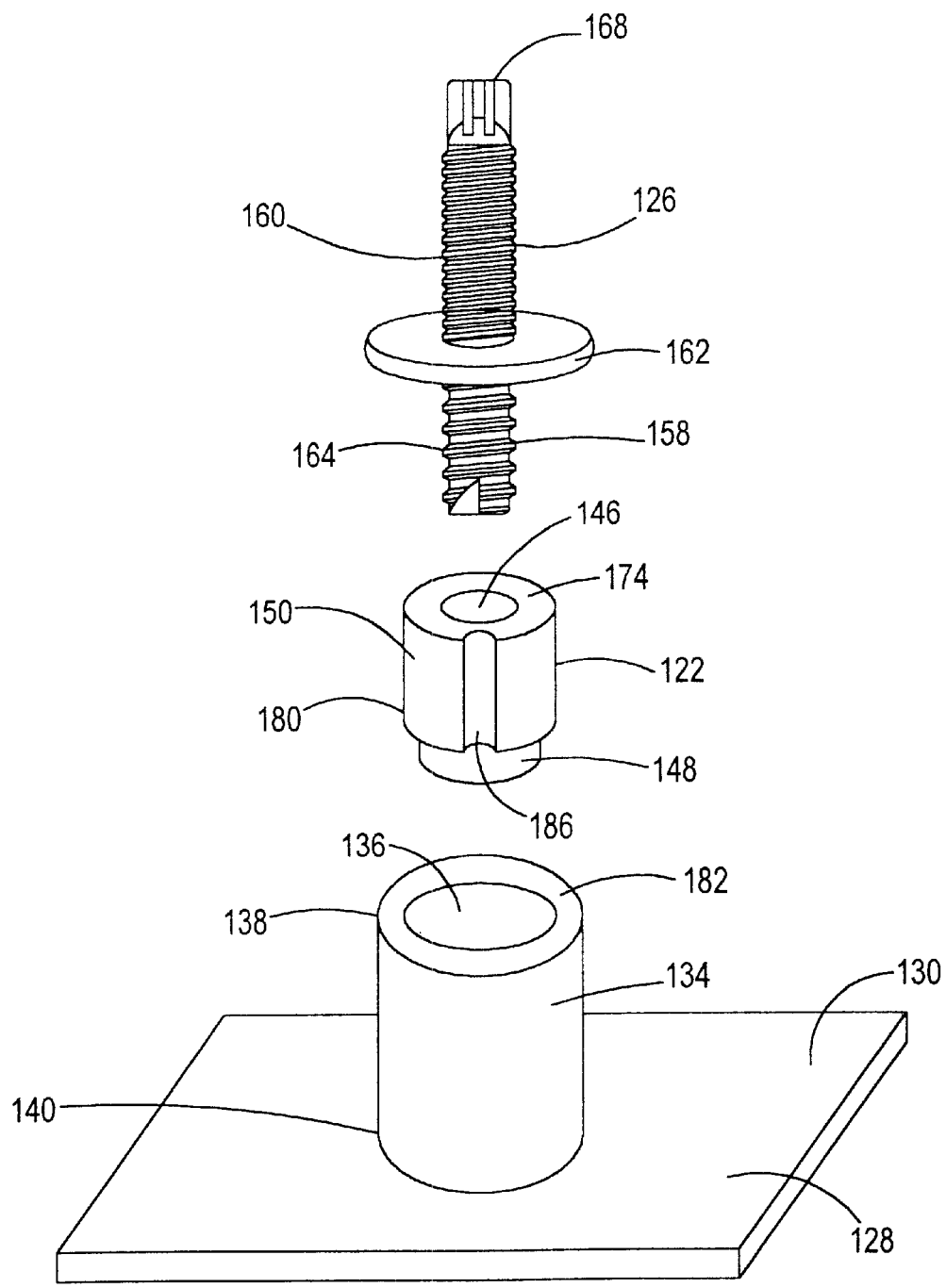
FIG. 11 displays an exploded perspective view of the first embodiment of the invention displaying an alternative embodiment of the insert used in the first embodiment.

A first spin weld assembly 120 is shown in FIGS. 1–4. A second spin weld assembly 220 is shown in FIG. 5. A third spin weld assembly 320 is shown in FIGS. 6–9. A fourth spin weld assembly 420 is shown in FIG. 10. Like elements are denoted with like reference numerals with the first embodiment being in the one hundreds, the second embodiment being in the two hundreds, the third embodiment being in the three hundreds, and the fourth embodiment being in the four hundreds. FIG. 11 shows an alternative embodiment of an insert 122 that could be used in either the first spin weld assembly 120, the second spin weld assembly 220, the third spin weld assembly 320, or the fourth spin weld assembly 420.

FIG. 1 displays the separate components of the first spin weld assembly 120. The first spin weld assembly 120 comprises an insert 122, a boss 124 and a fastener 126. The boss 124 is formed during the molding of a workpiece 128 on a first side 130 of the workpiece 128. The workpiece 128 also has a second side 132 or a cosmetic surface. The boss 1.24 and the workpiece 128 are preferably formed of plastic, although other materials having similar characteristics to plastic could also be utilized. The boss 124 formed on the workpiece 128 is made of a wall 134 that extends from the workpiece 128 and an opening 136 defined thereby. The opening 136 extends from a first end 138 of the wall 134, spaced from the workpiece 128, to a second end 140 of the wall 134 that abuts the workpiece 128.

The wall 134 of the boss 124 preferably has a thickness that is less than a thickness of the workpiece 128. If the boss 124 has a thickness that is equal to or greater than the thickness of the workpiece 128, a depression or sink (not shown) can be caused on the cosmetic surface 132 of the workpiece 128. Since such a depression or sink on the cosmetic surface 132 of the workpiece 128 is undesirable, the thickness of the wall 134 of the boss 124 is preferably less than the thickness of the workpiece 128 itself.

The insert 122 is also made of plastic or a material of suitable characteristics. The insert 122 and the boss 124, though, must both be. formed with materials which are conducive to being welded together to form a strong intimate connection therebetween through spin welding. The insert 122 is also molded, but must be molded to an appropriate size so that the insert 122 can be properly attached to the boss 124.

In the preferred embodiment, the insert 122 has a bore 146 therein. The bore 146 is sized to allow the fastener 126 to be inserted therein, allowing the fastener 126 to attach to the insert 122. The use of the insert 122 allows for the proper size fastener necessary for the assembly to be used. If the insert 122 was not utilized, two possible undesirable problems could occur. The first problem which could occur is that the boss would be molded such that the thickness of the wall is less than the thickness of the workpiece in order to prevent a depression or sink on the cosmetic surface of the workpiece. Thus, because the thickness of the wall would be relatively small, the opening would be relatively large, thereby requiring the use of heavier, thicker and more costly studs than are appropriate for the particular assembly. Also, the boss, having a relatively thin wall, would be relatively weak. The second problem which could occur is that the stud would be appropriately sized for the assembly, but then the stud would not be big enough to attach to the wall of the boss as the opening of the boss would be larger than the stud. This would require the wall of the boss to be thicker, and thus, possibly leading to depressions or sinks on the cosmetic surface of the workpiece. The insert 122 basically allows for the thickness of the wall 134 to be less than the thickness of the workpiece 128, while also providing additional material for a properly sized stud 126 to engage with.

The insert 122 is also molded having a first end 148 and a second end 150. The first end 148 of the insert 122 is formed having a diameter that is smaller than a diameter of the opening 136 of the boss 124. The first end 148 has a diameter smaller than the diameter of the opening 136 of the boss 124 to allow the insert 122 to be properly positioned and aligned with the opening 136 of the boss 124 at the first end 138 of the wall 134 prior to the attachment of the insert 122 with the boss 124.

The second end 150 of the insert 122 is formed having a diameter that is larger than the diameter of the opening 136 of the boss 124. The second end 150 has a diameter larger than the diameter of the opening 136 of the boss 124 to allow the insert 122 and the boss 124 to come into intimate engagement with the other during the attachment of the insert 122 to the boss 124.

The fastener 126 can be any type of fastener that can connect with the insert 122. In a preferred embodiment, the fastener 126 is a double ended collar stud with a TORX® external drive. The stud 126 is provided with a first end 158 and a second end 160 that are separated by a shoulder 162. The first end 158 of the stud 126 is the end that is to be inserted into the bore 146 of the insert 122 to attach the stud 126 to the insert 122. In the preferred embodiment, the first end 158 of the stud 126 is provided with self-tapping or thread forming thread configuration 164 as the bore 146 of the insert 122 is not provided with corresponding threads. The insert 122, though, could be provided with internal threading that corresponds to the external threading of a stud, thereby allowing the external threads of the stud to mesh with the internal threads of the insert.

The second end 160 of the stud 126 is provided with external threads 166 for attachment to a separate workpiece (not shown), as well as a TORX® external drive 168. The TORX® external drive 168 allows for a corresponding machine or tool (not shown) to drive the stud 126 into the bore 146 of the insert 122, thereby allowing the self-tapping threads 164 to attach the stud 126 to the insert 122. The TORX® external drive 168 could also allow the corresponding machine or tool to drive the attached stud 126 and insert 122 into the opening 136 of the boss 124, thereby allowing the insert 122 to attach to the wall 134 of the boss 124.

The shoulder 162 of the stud 126 separates the self-tapping or forming threads 164 of the first end 158 of the stud 126 from the external threads 166 and TORX® external drive 168 of the second end 160 of the stud 126. In the preferred embodiment, the shoulder 162 has a diameter larger than the diameter of the second end 150 of the insert 122. Also in the preferred embodiment, the diameter of the shoulder 162 is substantially equal to an outside diameter of the wall 134 of the boss 124.

Figure 2:
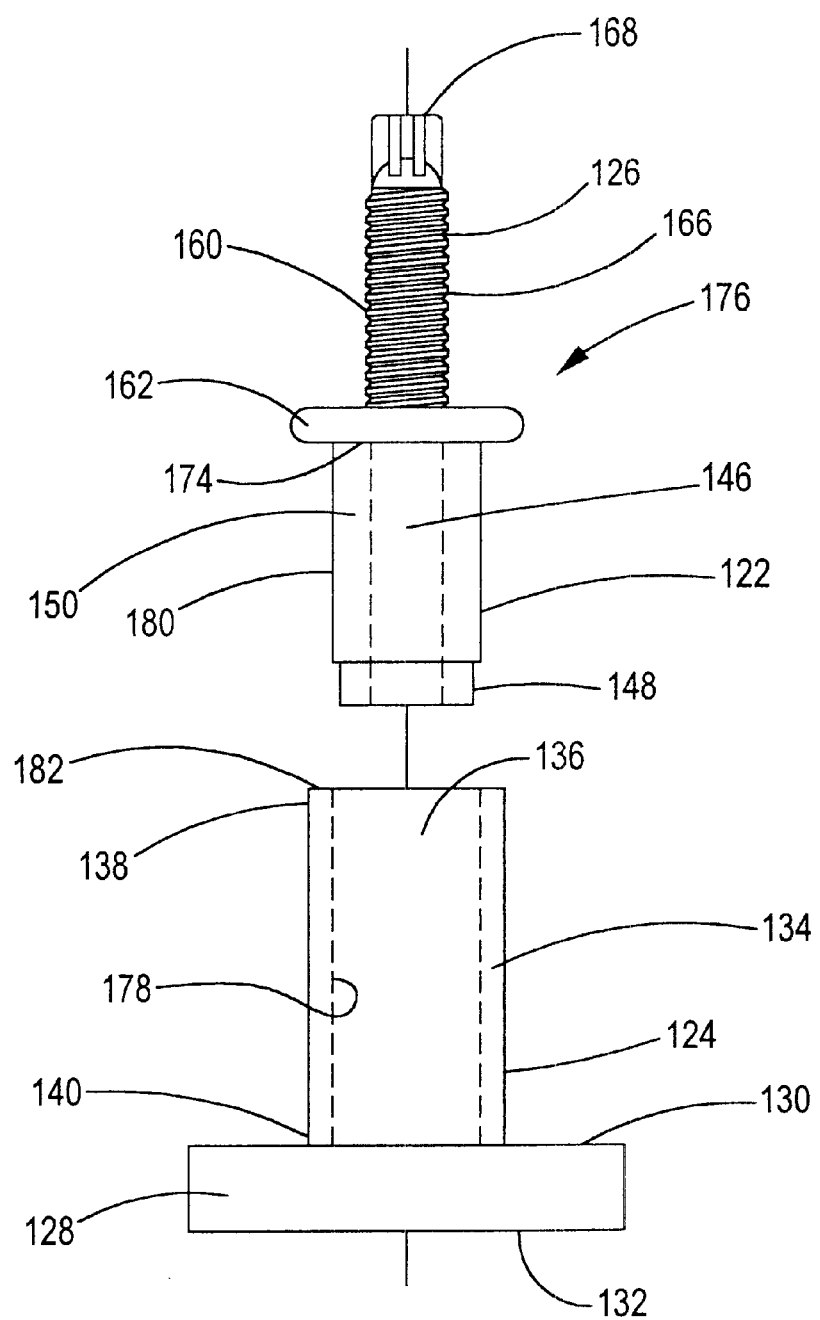

The preferred embodiment of the unique and novel method of forming the first spin weld assembly 120 is depicted in FIGS. 1–4. As seen in FIGS. 1 and 2, the stud 126 is rotated into the bore 146 of the insert 122. The stud 126 is rotated into the bore 146 of the insert 122 by a machine or tool that engages with the TORX® external drive 168. The machine or tool then applies an end load to the stud 126 and also rotates the stud 126. The self-tapping threads 164 of the stud 126 then rotate into the insert 122, thereby attaching the stud 126 to the insert 122. The machine or tool applies the end load to the stud 126 until the shoulder 162 of the stud 126 abuts against a top portion 174 of the insert 122 as seen in FIG. 2. The end result is a stud and insert assembly 176.

Figure 3:
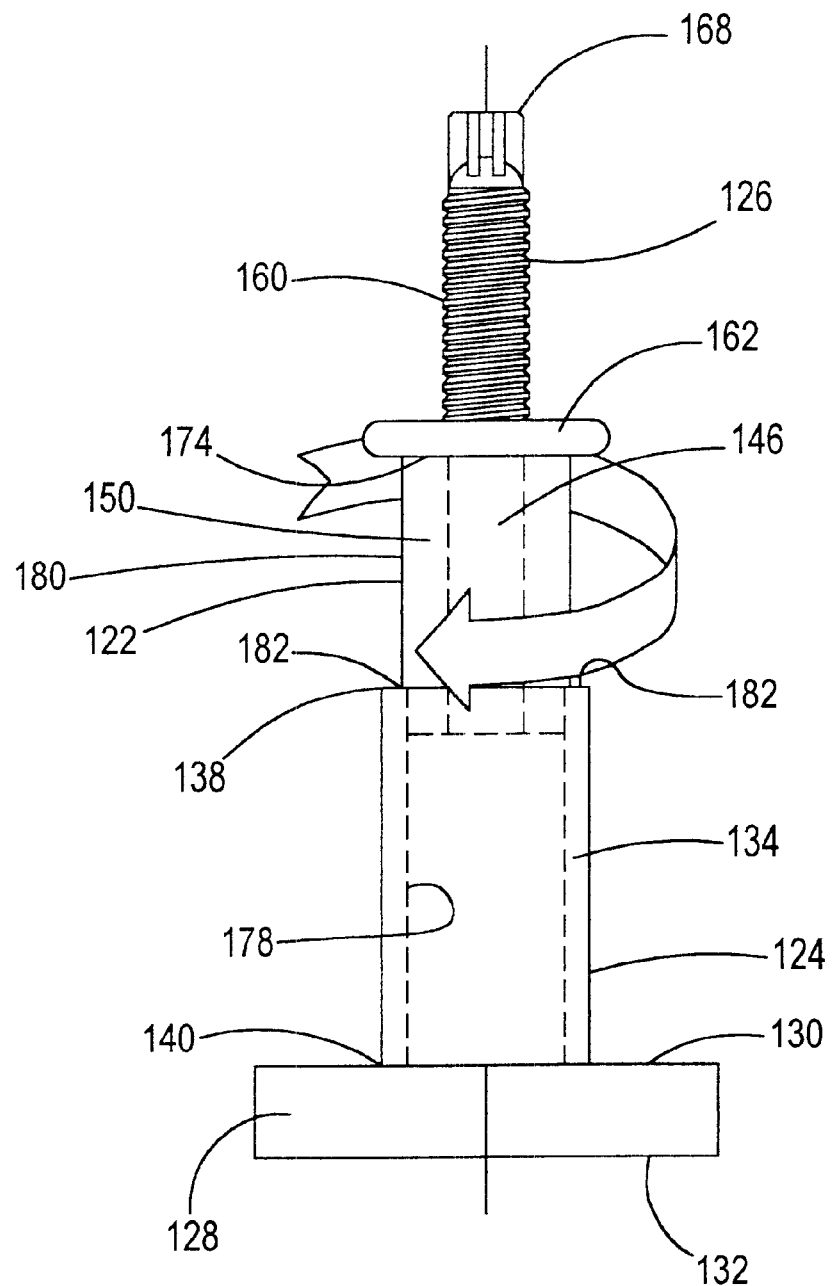

The stud and insert assembly 176 is then prepared for attachment to the boss 124. The first end 148 of the insert 122 is aligned with the opening 136 of the boss 124 as seen in FIG. 3. When the stud and insert assembly 176 is properly aligned with the opening 136 of the boss 124, a machine or tool is engaged with the TORX® external drive 168 of the stud 126. The machine or tool can be the same as that used to drive the stud 126 into the insert 122, or the machine or tool can be a different machine or tool. The machine or tool then applies an end load to the stud and insert assembly 176 causing the assembly 176 to rotate. Upon such rotation and load being applied to the stud and insert assembly 176, the second end 150 of the insert 122 comes into intimate engaging contact with the wall 134 of the boss 124 by being spin welded into the opening 136 of the boss 124. The spin welding causes material on an inner surface 178 of the wall 134 of the boss 124 to become intimately engaged with material on an outer surface 180 of said second end 150 of said insert 122. The machine or tool stops rotating and applying an end load to the stud and insert assembly 176 when the shoulder 162 of the stud 126 abuts against a top surface 182 of the boss 124 as seen in FIG. 4.

Figure 4:
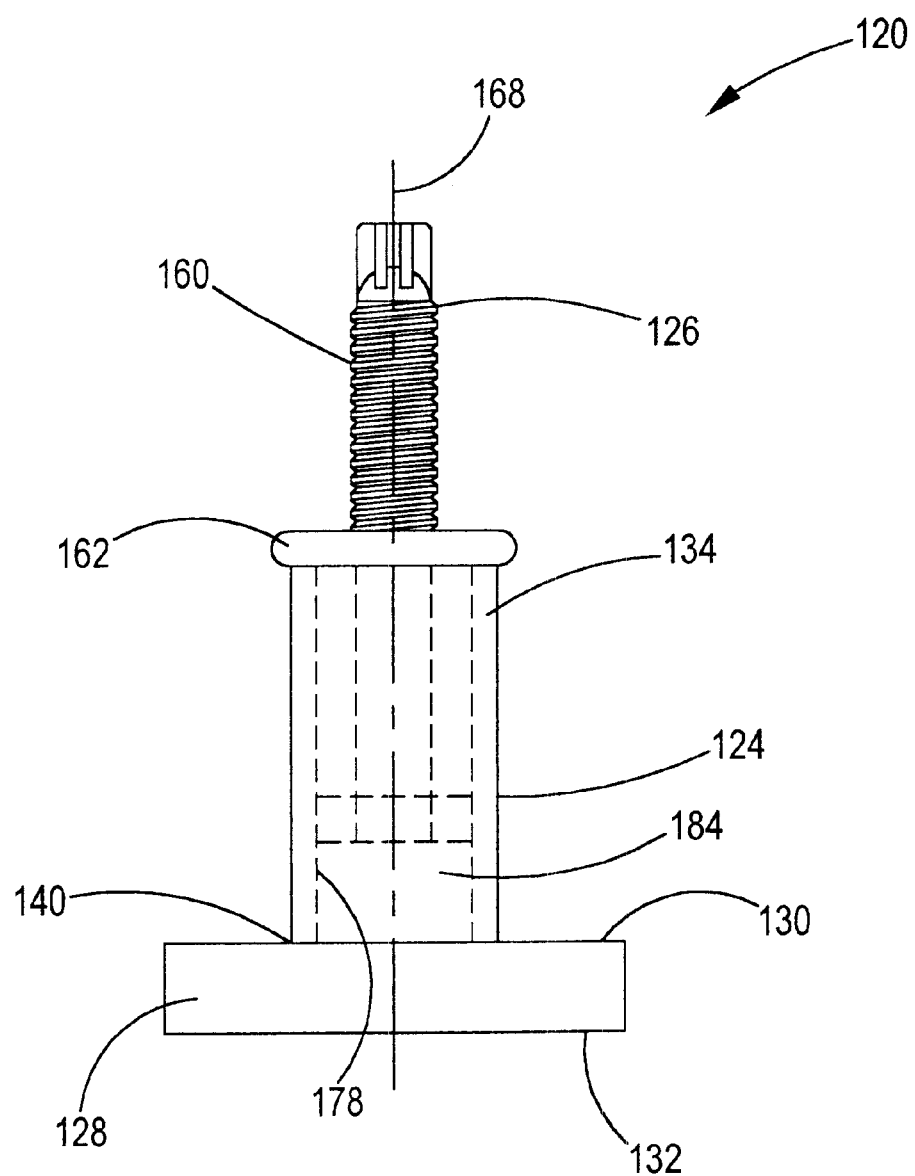
Figure 5:
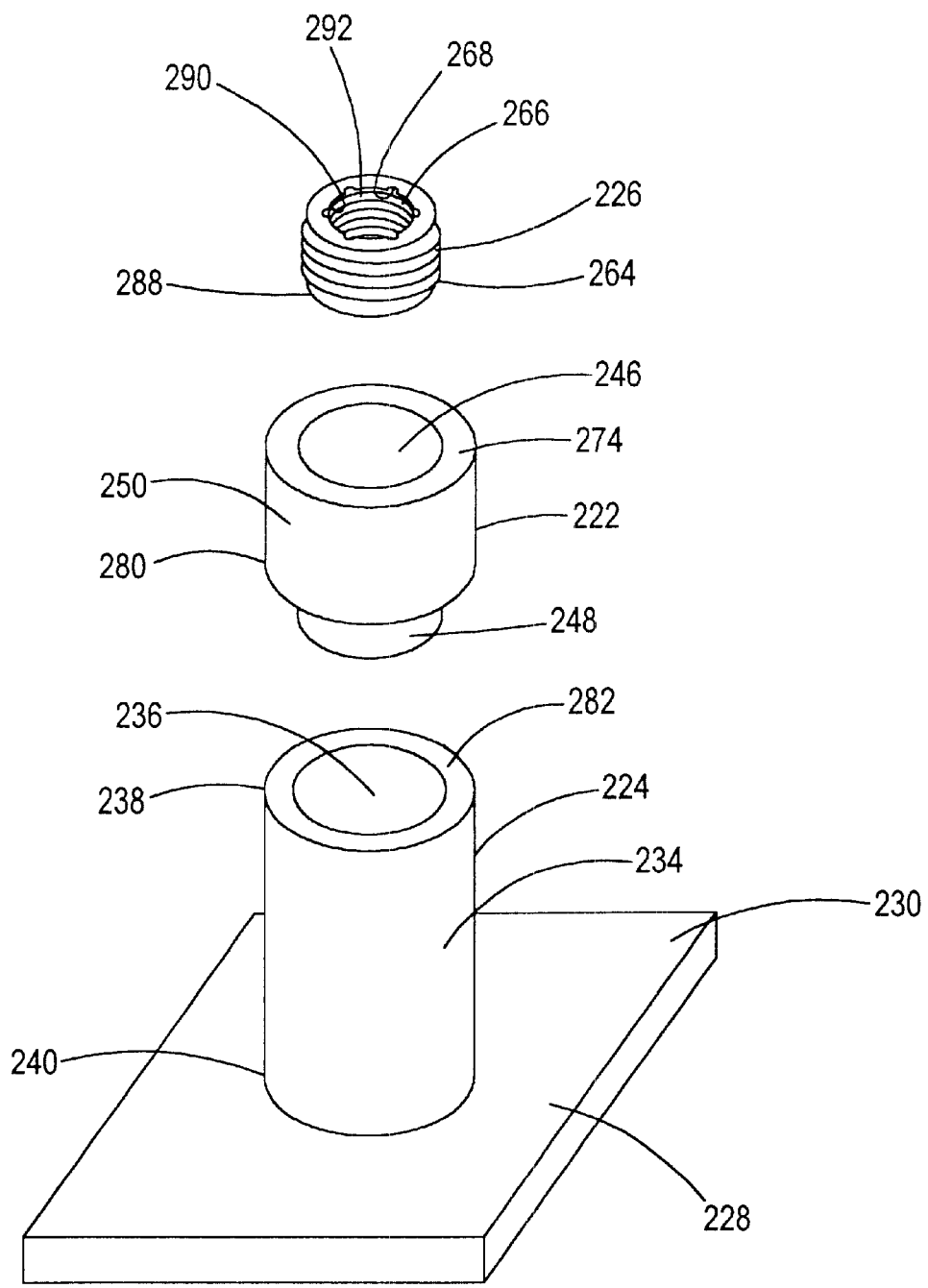
FIG. 5 displays an exploded perspective view of a second embodiment of the invention whereby the fastener of the first embodiment is in the form of a nut rather than a stud.

As can be seen from FIG. 4, the insert 122 has a length that is smaller than a length of the wall 134 of the boss 124. Because the length of the insert 122 is smaller than the length of the wall 134, a space 184 is provided between the insert 122, the wall 134 and the workpiece 128. The space 184 gives any air that was in the opening 136 of the boss 124 prior to the insert 122 being inserted therein a place to move to since the spin welding of the insert 122 to the wall 134 of the boss 124 provides an air-tight seal.

As seen in FIG. 11, the insert 122 can also be formed with a vent 186 that is an axially aligned channel that runs the length of the insert 122. Were the vent 186 used in the insert 122 of the first spin weld assembly 120, the vent 186 would allow any air within the opening 136 of the boss 124 to escape from the opening 136 after the insert 122 was spin welded to the boss 124, thereby relieving any possible air pressure that may have built up within the first spin weld assembly. 120 during the attachment of the insert 122 to the boss 124. The described alternative insert 122 with the vent 186 can also be used in the second, third and fourth embodiments described herein.

It should be noted that while the preferred embodiment of the method of forming the first spin weld assembly 120 is depicted in FIGS. 1–4, there are other possible ways of forming the first spin weld assembly 120. For instance, the insert 122 could first be spin welded into the boss 124 without use of the stud 126. The insert 122 could be molded to have a driving head thereon. A proper machine or tool could then engage with the driving head of the insert 122 and spin weld the insert 122 into the boss 124 by rotating and applying an end load to the insert 122. The self-tapping threads 164 of the stud 126 could then be rotated into the bore 146 of the insert 122 to allow the stud 126 to attach itself to the insert 122. Also, more complexly, the stud 126, insert 122 and boss 124 could all be attached to each other simultaneously by prealigning the stud 126, insert 122 and boss 124, and then rotating and driving them together.

A second spin weld assembly 220 is shown and described in FIG. 5. The second spin weld assembly 220 is substantially the same as the first spin weld assembly 120 except that the fastener 226 is a nut with a TORX® internal drive 268 whereas fastener 126 is a stud with a TORX® external drive 168.

The nut 226 is provided with an external wall 288 and an internal wall 290, the internal wall 290 being defined by a bore 292 that extends through the nut 226. In the preferred embodiment of the second spin weld assembly 220, the external wall 288 of the nut 226 is provided with self-tapping or thread forming thread configuration 264 as the bore 246 of the insert 222 is not provided with corresponding threads. The insert 222, though, could be provided with internal threading that corresponds to external threading of a nut, thereby allowing the external threads of the stud to mesh with the internal threads of the insert. The internal wall 290 of the nut 226 is provided with internal threads 266 for attachment to a separate workpiece (not shown).

An end of the nut 226 is also provided with the TORX® internal drive 268. The TORX® internal drive 268 allows for a corresponding machine or tool (not shown) to drive the nut 226 into the bore 246 of the insert 222, thereby allowing the self-tapping threads 264 to attach the nut 226 to the insert 222. The TORX® internal drive 268 could also allow the corresponding machine or tool to drive the attached nut 226 and insert 222 into the opening 236 of the boss 224, thereby allowing the insert 222 to attach to the wall 234 of the boss 224.

The forming of the second spin weld assembly 220 is done in the same fashion as the first spin weld assembly 120, except that the nut 226 is driven into the bore 246 of the insert 222 to form a nut and insert assembly 276 rather than the stud 126 being driven into the bore 146 of the insert 122 to form a stud and insert assembly 176. The only difference between the two operations is knowing when to stop applying the end load to the nut 226. In the preferred embodiment, the nut 226 is not provided with a shoulder to indicate when the driving should end, as is the stud 126. The nut 226, though, could be provided with such a shoulder if desired to perform the same function as does the shoulder 162 of the stud 126. Therefore, when forming the second spin weld assembly 220, the machine or tool applying the end load must know when to stop the end load, or if a human operator is applying the end load with a tool, the human operator must gauge when to stop applying the end load by sight or feel when the desired position of the nut 226 within the bore 246 of the insert 222 is achieved.

Figure 6:
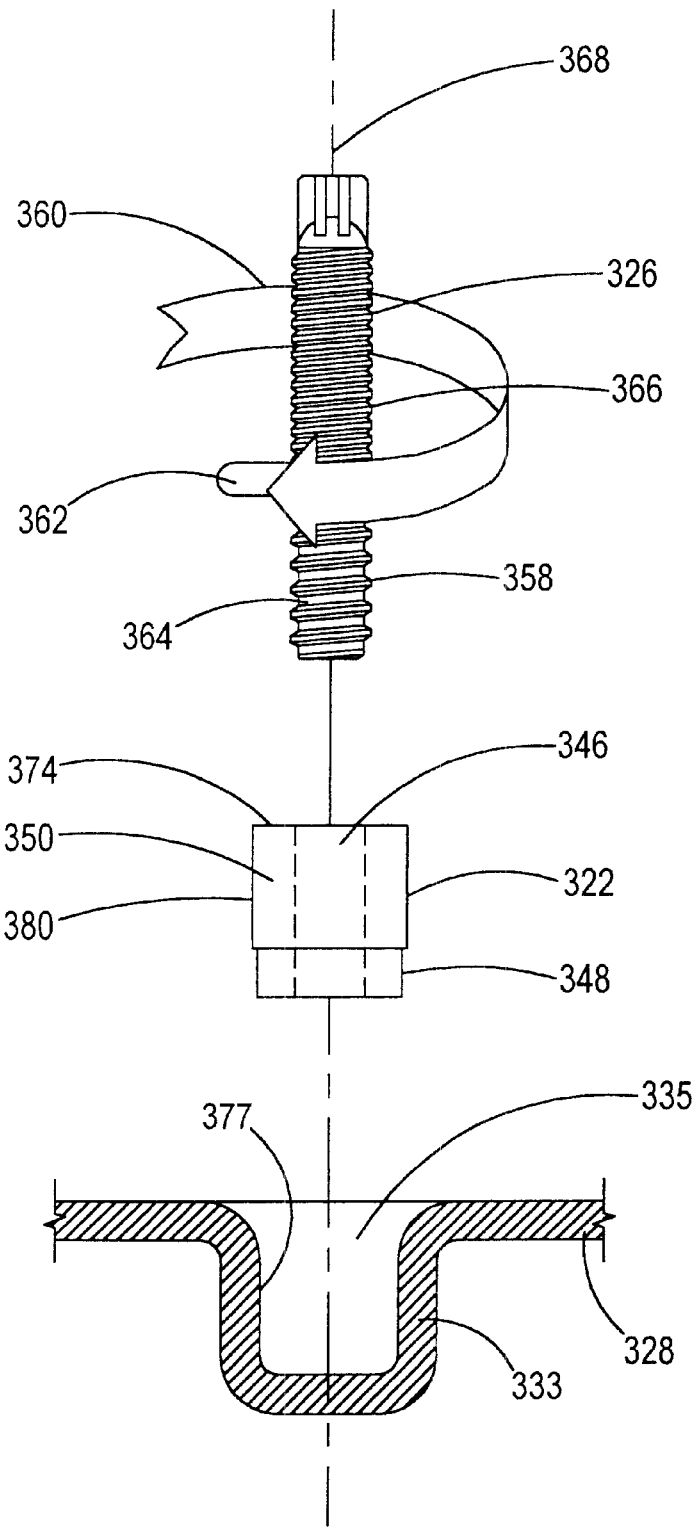
FIGS. 6–9 display a side elevational view of the method of forming a third embodiment of the spin weld assembly and the components used to form the spin weld assembly, namely a fastener in the form of a stud, an insert, and a molded workpiece having a recess cavity formed thereon.
Figure 7:
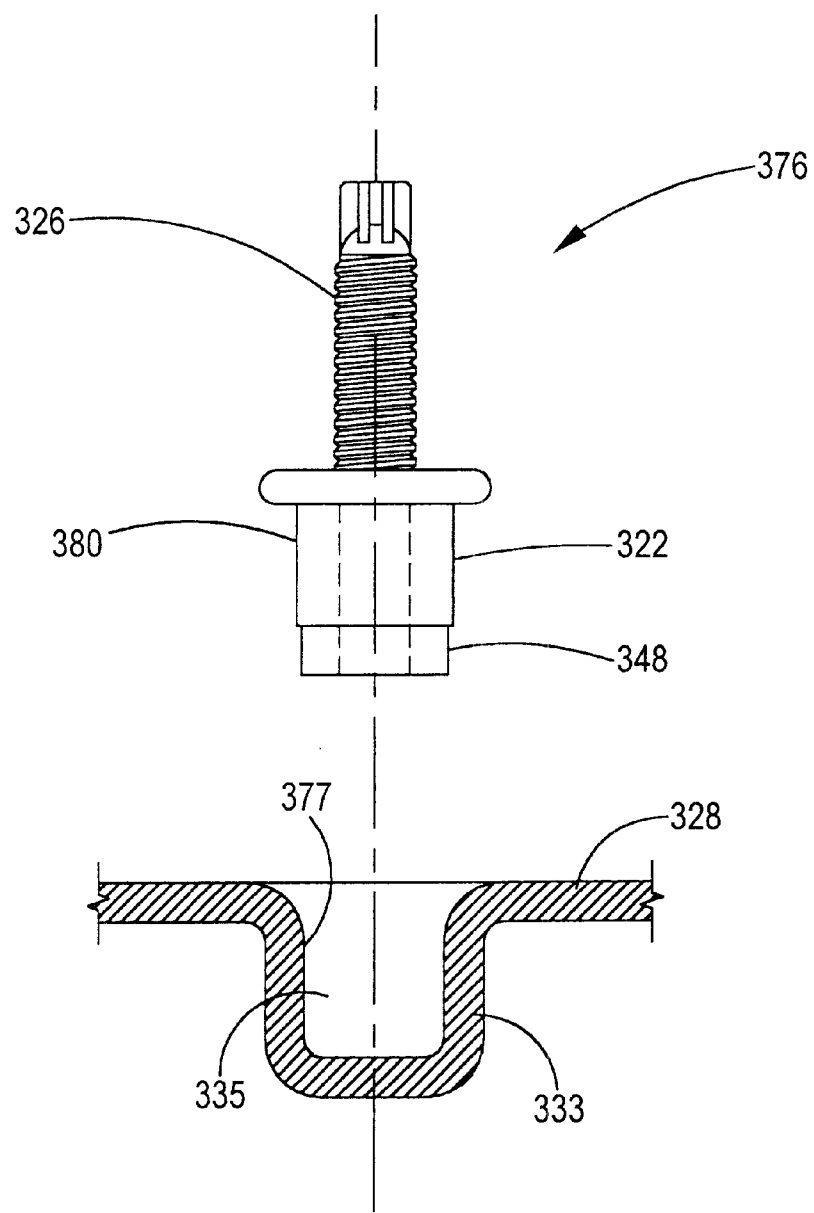
Figure 8:
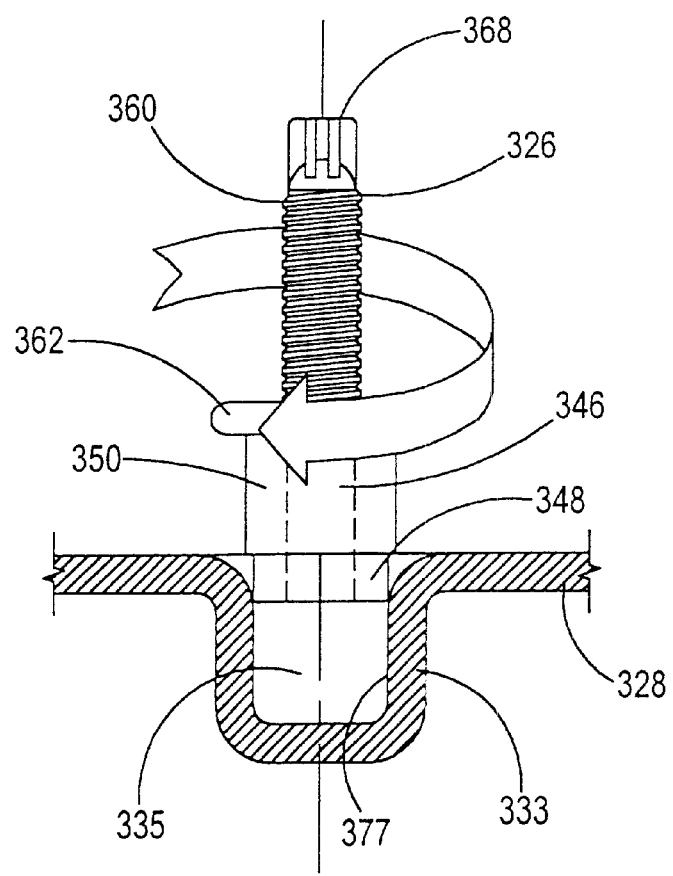
Figure 9:
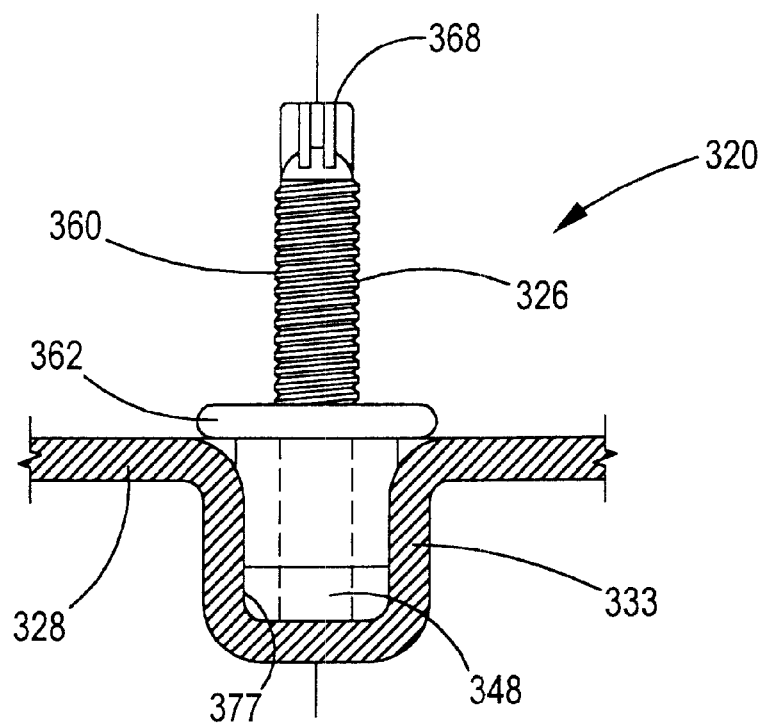

A third spin weld assembly 320 is shown and described in FIGS. 6–9. As can be seen in FIG. 6, the workpiece 328 is molded to have a recessed cavity 335 therein, the recessed cavity 335 being defined by a cavity wall 333. The cavity wall 333 is analogous to the wall 134, 234 of the boss 124, 224 in the first and second embodiments.

Similar to the description above for the first spin weld assembly 120, it is desirable to have a stud and insert assembly 376 spin welded to the cavity wall 333 of the workpiece 328 in the same manner as the stud and insert assembly 176 was spin welded to the wall 134 of the boss 124 in the first spin weld assembly 120. Without, the use of the insert 322, the stud would have to be attached directly to the workpiece. This attachment might be accomplished by ultrasonically welding the stud to the workpiece or driving the stud into the recess. Problems such as leakage, though, have occurred with these attachment methods, thereby requiring the assembly that has a leak to be removed and replaced with a new assembly. The ultrasonic welding of the stud to the workpiece also caused recycling problems of the plastic once a leak had occurred. With the third spin weld assembly 320, such problems are alleviated, because the leaks should not occur and the stud 326 can be easily removed from the insert 322 such that the plastic insert 322 and the plastic workpiece 328 can be easily recycled, if necessary.

The third spin weld assembly 320 incorporates a stud 326 and an insert 322 similar to that of the first spin weld assembly 120. The size of the stud 326 and the insert 322 for the second spin weld assembly 320 can be properly dimensioned for the attachment to be made. The method of forming the third spin weld assembly 320 is also the same as that described hereinabove for the first spin weld assembly 120, except that the first end 348 of the insert 322 is aligned-with the cavity 335 of the workpiece 328 and then the stud and insert assembly 376 is then spin welded into the cavity 335 of the workpiece 328 such that material on an outside surface 380 of the second end 350 of the insert 322 comes into intimate contact with material on an inner surface 377 of the cavity wall 333.

A fourth spin weld assembly 420 is shown and described in FIG. 10. The fourth spin weld assembly 420 is substantially the same as the third spin weld assembly 320 except that the fastener 426 is a nut with a TORX® internal drive 468 whereas fastener 326 is a stud with a TORX® external drive 368. The nut 426 is formed of the same structure as the nut 226 which was described hereinabove in relation to the second spin weld assembly 220. The nut 426 is also driven into the insert 422 to form the nut and insert assembly 476 in substantially the same way as the nut 226 is driven into the insert 222 to form the nut and insert assembly 276. The method of forming the fourth spin weld assembly 420 is also the same as that described hereinabove for the second spin weld assembly 220, except that the nut and insert assembly 476 is spin welded into the cavity 435 of the workpiece 428 such that material on an outside surface 480 of the second end 450 of the insert 422 comes into intimate contact with material on an inner surface 477 of the cavity wall 433.

It should also be noted that while spin welding the insert 122, 222, 322, 422 into the boss 124, 224 of the first and second spin weld assemblies 120, 220 or the cavity wall 333, 433 of the third and fourth spin weld assemblies 320, 420 along with self-tapping the fastener 126, 226, 326, 426 into the insert 122, 222, 322, 422 are the preferred methods of the present invention, other methods of attaching the fastener 122, 222, 322, 422 to the insert 122, 222, 322, 422 and the insert 122, 222, 322, 422 to the boss 124, 224 or cavity wall 333, 433 can also be utilized. For instance, ultrasonic welding could be used to both attach the fastener to the insert as well as attach the insert to either the boss or the recess cavity. Also, adhesives could be used to aid in such attachments.

The invention is claimed as follows:

1. A method of attaching a fastener to a workpiece, comprising the steps of:
   a) providing said workpiece with at least one wall extending therefrom, said wall having an aperture of a predetermined diameter therein to define an aperture wall;
   b) providing an insert having a first end portion, a second end portion, and a bore therein, said bore extending through at least said second end portion;
   c) providing a fastener having external threads;
   d) attaching said fastener to said insert by threading said fastener into said bore of said insert;
   e) aligning said first end portion of said insert with said aperture of said wall; and
   f) rotating and generally axially displacing said insert into said aperture to spin weld said second end portion of said insert to said aperture wall.

2. A method as defined in claim 1, wherein said external threads of said fastener are self-tapping threads.

3. A method as defined in claim 1, wherein said fastener is a stud.

4. A method as defined in claim 1, wherein said first end portion of said insert has a diameter smaller than said predetermined diameter of said aperture to permit alignment of said insert with said aperture of said wall, said second end portion of said insert having a diameter larger than or equal to said predetermined diameter of said aperture to provide engaging contact between said second end portion of said insert and said aperture wall.

5. A method as defined in claim 3, further comprising the steps of providing said stud with a shoulder, threading said stud into said bore of said insert until said shoulder of said stud abuts a portion of said second end portion of said insert until said shoulder of said stud abuts a portion of said second end portion of said insert, and rotating and displacing said insert to spin weld said second end portion of said insert to said aperture wall until said shoulder of said stud abuts a portion of said wall.

6. A method as defined in claim 1, wherein said fastener is a nut.

7. A method as defined in claim 6, further comprising the step of providing said nut with internal threading.

8. A method of attaching an insert to a workpiece, comprising the steps of:
   a) providing said workpiece with at least one wall extending therefrom, said wall having an aperture of a predetermined diameter therein to define an aperture wall;
   b) providing an insert having a first end portion and a second end portion;
   c) aligning said first end portion of said insert with said aperture of said wall; and
   d) rotating and generally axially displacing said insert into said aperture to spin weld said second end portion of said insert to said aperture wall.

9. A method as defined in claim 8, further comprising the steps of:
   e) providing said insert with a bore therein which extends through at least said second end portion;
   f) providing a fastener having external threads; and
   g) attaching said fastener to said insert by threading said fastener into said bore of said insert.

10. A method as defined in claim 9, wherein said threads of said fastener are self-tapping threads.

11. A spin weld assembly comprising:
   a) a plastic workpiece having at least one wall extending therefrom, said wall having an aperture of a predetermined diameter therein to define an aperture wall; and b) a plastic insert having a first end portion, a second end portion, and a bore therein, said insert being received in said aperture of said wall to provide engaging contact between said second end portion of said insert and said aperture wall.

12. A spin weld assembly as defined in claim 11, wherein said aperture of said wall defines an outwardly protruding boss.

13. A spin weld assembly as defined in claim 11, wherein said aperture of said wall is an inwardly recessed cavity.

14. A spin weld assembly as defined in claim 11, wherein said insert is attached to said aperture wall by spin welding said insert into said aperture of said wall.

15. A spin weld assembly as defined in claim 11, further comprising a fastener, said fastener attached to said insert through said bore of said insert providing engaging contact between an outside surface of said fastener and an inside surface of said insert.

16. A spin weld assembly as defined in claim 15, wherein said fastener has external threads, said external threads allowing said fastener to be threaded into said bore of said insert to provide engaging contact between an outside surface of said fastener and an inside surface of said insert.

17. A spin weld assembly as defined in claim 16, wherein said external threads of said fastener are self-tapping threads.

18. A spin weld assembly as defined in claim 15, wherein said fastener is a stud.

19. A spin weld assembly as defined in claim 18, wherein said stud is provided with a shoulder, said shoulder prohibits said stud from entering said bore of said insert beyond a predetermined distance.

20. A spin weld assembly as defined in claim 18, wherein said shoulder of said stud abuts against a top surface of said insert when said stud has entered said bore of said insert at said predetermined distance.

21. A spin weld assembly as defined in claim 15, wherein said fastener is a nut having internal threading.

22. A spin weld assembly as defined in claim 11, wherein said first end portion of said insert has a first diameter and said second end portion of said insert has a second diameter, said first diameter of said first end portion being smaller than a diameter of said aperture of said wall to permit alignment of said insert with said aperture of said wall, said second diameter of said second end portion being larger than said diameter of said aperture of said wall to provide engaging contact between said insert and said aperture wall.

23. A spin weld assembly as defined in claim 11, wherein said insert has a length smaller than a length of said aperture wall, thereby providing a space between an end of said insert and an end of said wall.

24. A spin weld assembly as defined in claim 11, wherein one of said insert and said aperture wall have a vent therein.

25. A spin weld assembly as defined in claim 24, wherein said vent on said insert is a generally axially aligned channel.

26. A spin weld assembly as defined in claim 11, wherein said wall has a thickness generally equal to or less than a thickness of said workpiece.

27. A method of attaching an insert to a workpiece, comprising the steps of:
a) providing said workpiece with an interior surface and an exterior surface, said workpiece having at least one boss extending inwardly from said interior surface, said boss having an aperture therethrough of a predetermined diameter which defines an aperture wall;
b) providing an insert having a first portion and a second portion, said first portion having an outer diameter which is smaller than said predetermined diameter of said aperture, said second portion having an outer diameter which is larger than said predetermined diameter of said aperture;
c) aligning said first portion of said insert with said aperture of said boss; and
d) rotating and generally axially displacing said insert into said aperture to spin weld said second portion of said insert to said aperture wall of said boss.

28. A method as defined in claim 27, wherein said boss has a thickness which is equal to or less than a thickness of said workpiece.

29. A method as defined in claim 27, wherein said rotation of said insert into said aperture will not form a depression on said exterior surface of said workpiece.

30. A method of attaching an insert to a workpiece, comprising the steps of:
a) providing said workpiece with at least one recessed cavity of a predetermined diameter therein which defines a cavity wall, said workpiece having an inner surface and an outer surface, said inner surface of said workpiece defining an inner surface of said cavity wall, said outer surface of said workpiece defining an outer surface of said cavity wall, said cavity wall protruding from said workpiece;
b) providing an insert having a first portion and a second portion, said first portion having an outer diameter which is smaller than said predetermined diameter of said cavity, said second portion having an outer diameter which is larger than said predetermined diameter of said cavity;
c) aligning said first portion of said insert with said cavity of said workpiece; and
d) rotating and generally axially displacing said insert into said cavity to spin weld said second portion of said insert to one of said inner or outer surfaces of said cavity wall of said workpiece.

31. A method as defined in claim 30, wherein said cavity wall has a thickness which is equal to or less than a thickness of said workpiece.

32. A spin weld assembly comprising:
a workpiece having an interior surface and an exterior surface, said workpiece having at least one boss extending inwardly from said interior surface, said boss having an aperture therethrough of a predetermined diameter which defines an aperture wall; and
an insert having a first portion and a second portion, said first portion having an outer diameter which is smaller than said predetermined diameter of said aperture, said second portion having an outer diameter which is larger than said predetermined diameter of said aperture, said insert being received in said aperture of said boss and providing engaging contact between an outer surface of said second portion of said insert and said aperture wall of said boss.

33. A spin weld assembly as defined in claim 32, wherein said boss has a thickness which is equal to or less than a thickness of said workpiece.

34. A spin weld assembly as defined in claim 32, wherein said insert being received in said aperture to provide engaging contact between said second portion of said insert and said aperture wall does not form a depression on said exterior surface of said workpiece.

35. A spin weld assembly comprising:
a) a workpiece having at least one recessed cavity of a predetermined diameter therein which defines a cavity wall, said workpiece having an inner surface and an outer surface, said inner surface of said workpiece defining an inner surface of said cavity wall, said outer surface of said workpiece defining an outer surface of said cavity wall, said cavity wall protruding from said workpiece; and
b) an insert having a first portion and a second portion, said first portion having an outer diameter which is smaller than said predetermined diameter of said cavity, said second portion having an outer diameter which is larger than said predetermined diameter of said cavity, said insert being received in said cavity of said workpiece and providing engaging contact between an outside surface of said second portion of said insert and one of said inner and outer surfaces of said cavity wall.

36. A spin weld assembly as defined in claim 35, wherein said cavity wall has a thickness which is equal to or less than a thickness of said workpiece.

* * * * *